United States Patent [19]
Nickell

[11] 3,897,240
[45] July 29, 1975

[54] USE OF BACITRACIN AS RIPENER FOR SUGARCANE

[75] Inventor: Louis G. Nickell, Honolulu, Hawaii

[73] Assignee: Hawaiian Sugar Planters' Association, Honolulu, Hawaii

[22] Filed: Mar. 28, 1974

[21] Appl. No.: 455,954

[52] U.S. Cl. ................................................. 71/90
[51] Int. Cl. ............................................. A01n 9/12
[58] Field of Search ................................. 71/90, 88

[56] References Cited
UNITED STATES PATENTS 3,505,056  4/1970  Nickell et al. ....................... 71/79 X
3,756,801  9/1973  Herschler ............................... 71/79

OTHER PUBLICATIONS

Hawaiian Planters Record, Vol. 58, No. 5, pp. 71–79, (1970).

*Primary Examiner*—James O. Thomas, Jr.
*Attorney, Agent, or Firm*—Burns, Doane, Swecker & Mathis

[57] ABSTRACT

Sucrose yield of sugarcane is increased by treating the cane crop a few weeks prior to harvest with a ripening agent comprising bacitracin.

6 Claims, No Drawings

3,897,240

USE OF BACITRACIN AS RIPENER FOR SUGARCANE

BACKGROUND OF THE INVENTION

As sugar is among the principal foods for man and animals, as well as a commercially important food for fermentation organisms, much research is being devoted to raising the sucrose yield of sugarcane in a variety of ways. In recent years this research has increasingly turned toward a search for chemical agents which effectively enhance the ripening of sugarcane and do so in a manner which is both safe and economical.

Some of the more successful chemical ripeners for sugarcane so far discovered are disclosed in U.S. Pat. Nos. 3,224,865; 3,245,775; 3,291,592; 3,482,959; 3,482,961; 3,493,361; 3,505,056; 3,660,072 and 3,671,219. Still other chemical agents which have been found successful or shown promise as sugarcane ripeners, such as cyclo-leucine, anisomycin and cycloheximide, are disclosed, for instance, in Hawaiian Planters' Record, Vol. 58, No. 5, pp. 71–79 (1970).

As is evident from these prior disclosures, the more active ripeners differ widely from each other in terms of chemical structure as well as chemical and biological properties. In the search for effective ripeners failures continue to outnumber successes by a wide margin. As of this data there is still no known screening test for determining the ripening activity of a compound other than to test it on maturing sugarcane. Moreover, because of toxicological or ecological concerns and the consequent possibility that rotation of use of different chemical ripeners in consecutive seasons in a given area may be preferable to the continued use of a single ripener or ripener mixture, the search for new sugarcane ripeners continues unabated.

Generally speaking, chemicals selected for evaluation are those which have been previously found active in work with other plants as plant hormones, hormonal or non-hormonal herbicides, antifungal agents or antibiotics, growth inhibitors or, contrariwise, growth stimulants. However, among the compounds heretofore known to be useful for such other special and often contradictory purposes only an exceptional few are found to be effective in controlling the ripening of sugarcane in the desired manner.

No predictable relationship has yet been recognized between (a) the chemical structure of such compounds, (b) their phytotoxic effects, or (c) their physiological effects on the morphogenetic development of the plant, on the one hand, and their activity in having positive effects on ripening, on the other hand. Thus, for instance, among the sugar ripeners which have previously been found effective, both cycloheximide (an active antibiotic) and the mono-N,N-dimethyldodecylamine salt of endothal have a lethal action on the growth of duckweed even at a dosage of only 5 ppm while isoaureomycin strongly stimulates the growth of duckweed at all concentrations tested. Of all antibiotics known to have been heretofore tested for use as sugarcane ripeners, only cycloheximide and anisomycin are known to have been effective. The commerical use in the field of either cycloheximide or anisomycin has never been seriously considered because of their high cost and high mucosal toxicity in mammals. The use of penicillin as a sugar ripener forms the subject matter of the present applicant's copending application Ser. No. 455,955 filed March 28, 1974 (Docket No. H-676). Among other antibiotics and antimicrobial agents previously tested for use as sugar ripeners have been thiolutin, isonicotinic acid hydrazide, terramycin, beta-apo-terramycin, tetracycline, aureomycin, polymixin-B, nalidixic acid, griseofulvin, tyrothricin, usnic acid and hadacidin, but none of these has produced a useful ripening effect.

U.S. Pat. No. 3,756,801 (Herschler) discloses that the penetration of plant-active agents into plant tissues can be enhanced by applying the plant-active agent to the plant in a composition in which dimethylsulfoxide has been included. This expedient has been sweepingly proposed for use with a wide variety of plant-active agents having widely diverse protective, nutrient, growth regulating, decorative or other functions, including insecticides, fungicides, virucides, antibiotics, nutrients, metal salts, plant growth regulators, odorants, colorants, herbicides and defoliating agents.

Among the many diverse examples of U.S. Pat. No. 3,756,801 one discloses the injection of bacitracin and streptomycin in dimethylsulfoxide into the xylem of peach, pear, Douglas fir and Lombardy poplar trees. It can only be assumed that the antibiotics were used for their normal purpose, i.e., to control fungal, bacterial or viral infections, as the only specific effect attributed by the patentee to such treatment is the killing of bacteria (yeast) by the sap pressed from the treated trees. However, in the fruit trees so treated, phytotoxicity was observed by the patentee and attributed to the activities of the antibiotics.

OBJECTS OF THE INVENTION

It is an object of this invention to provide an antibiotic which is economically useful as a chemical ripening agent for sugarcane. A more general object is to increase the sucrose yield of sugarcane by chemically treating it during its maturation prior to harvest without introducing objectionable toxicological hazards. More specifically, it is an object of this invention to increase the sucrose yield of maturing sugarcane by treating a cane crop as the end of their normal maturation cycle or their normal harvest date approaches with a relatively inexpensive antibiotic which is sufficiently stable to provide the desired effect over a period of several weeks between application and a variable harvest date, but yet has a relatively low degree of persistence and is susceptible to autodecomposition or to decomposition by soil bacteria. A compound which increases the sucrose content only temporarily over a period of three weeks or less after application and then results in a substantial decrease is usually not a desirable chemical ripener except in situations where harvesting time can be rigidly programmed in advance in relation to the time of application of the chemical ripener.

SUMMARY OF THE INVENTION

According to the present invention the desired objectives have been achieved by the application of a ripening composition comprising bacitracin or an acid derivative thereof such as bacitracin methylenedisalicylate or soluble salts such as sodium, or insoluble salts such as zinc. More specifically, an excellent increase in sucrose yield has been obtained by applying a spray or dust comprising commerical medicinal bacitracin or a mixture of bacitracin containing a major proportion, preferably at least 60 percent by weight bacitracin A admixed with other bacitracins or derivatives thereof to sugarcane stalks in a crop which is nearing the normal maturity stage, and harvesting such crops some weeks later. The composition is applied directly to the stalks by spraying, dusting or the like in order that it be deposited on the stalks including the younger, growing parts thereof.

As is well known, the normal maturation cycle of sugarcane can vary considerably depending on local conditions, from less than 1 year to 3 years or more. For instance, under conditions such as those prevailing in Hawaii sugarcane is normally ripe for harvesting when about 18 to 36 months of age while in other areas of the world sugarcane can be only 9 to 12 months of age when harvested.

The preferred usage form is a mixture containing the commerical medicinal bacitracin in an aqueous solution or suspension utilizing one or a combination of known surface active agents commonly and variously used in the prior art as wetting agents, detergents or emulsifying agents. However, dry dusting compositions containing bacitracin and a solid diluent such as clay are also useful.

As is well known, bacitracin, an antibiotic polypeptide, is a greyish-white powder, soluble in water, methanol, ethanol, isopropyl alcohol, n-butanol and the like, but is insoluble in solvents such as diethyl ether, acetone or chloroform. It is produced by *Bacillus subtilis* in shallow culture with tryptone or protein hydrolyzate broth: Johnson et al, Science, 102, 376 (1945). Its production is further described by Freaney et al in U.S. Pat. No. 2,828,246. When substantially dry, it retains potency for many months at 37°C. but loses potency rapidly at 56°C. It is relatively stable in acid solutions, unstable in alkaline solutions above pH 9. However, aqueous solutions adjusted to a pH between 5 and 9 retain their potency for several months if refrigerated, e.g., if stored at 4°C. Bacitracin has a molecular weight of 1411 and the formula $C_{66}H_{103}N_{17}O_{16}S$ has been suggested for it.

U.S. Pat. No. 2,774,712 (Baron) contains a disclosure of a method for preparing bacitracin methylenedisalicylate by the reaction of two moles methylenedisalicylic acid and one mole bacitracin.

Bacitracin has been widely used in the prior art in human and veterinary therapy because of its activity against gram-positive bacteria, gonococci and other infectious organisms. It has also been used as a growth factor for hogs, chickens and turkeys. As already stated, it has also been disclosed in the prior art as one of many plant-active agents the penetration of which into plants such as Douglas fir, Lombardy poplar, peach or pear trees is alleged to have been enhanced by injecting it into the xylem of such trees in solution in dimethylsulfoxide. However, the application of bacitracin directly to the maturing stalks of sugarcane or the surprising increase of sucrose yield resulting therefrom has not been heretofore suggested.

The present discovery of the effective ripening activity of bacitracin is astonishing, as most other antibiotics heretofore tested as potential sugarcane ripeners have been found to produce no useful effect in terms of a measurable or commerically measurable increase in the crop treated.

In accordance with this invention, a sugarcane crop which is nearing the normal maturity stage is treated with bacitracin or with a composition containing same about two to ten weeks before harvest, the preferred time for treatment being between about four and eight weeks prior to harvest.

Good results are obtained when the sugarcane crop is treated at a rate in the range of from 1 to 4 pounds of commerical medicinal bacitracin or equivalent bacitracin containing composition per acre of sugarcane. However, higher rates (e.g., up to about 30 pounds of antibiotic or more per acre) or rates lower than 1 pound per acre can also be used. The optimum amount will vary somewhat depending on the particular mode of application, environmental conditions, time of year, and age and variety of cane being treated, but can readily be determined for each particular case by preliminary testing.

The active agent is conveniently applied in the field in the form of an aqueous solution, emulsion or suspension, i.e., in a liquid composition which may be sprayed onto the maturing cane plants from a boom-spray, or it can be dusted on from an airplane or the like as a dust composition which contains the active compound diluted with an inert solid such as clay.

In preparing suitable liquid compositions, surface active agents of the type described, for instance, in U.S. Pat. No. 3,224,865, column 2, lines 61–66 or in U.S. Pat. No. 3,245,775, column 2, lines 57–64 are convenient to use. The preferred surfactants for use in liquid compositions of the present invention are those of the non-ionic type, e.g., alkyl phenoxy poly(ethyleneoxy)ethanols such as adducts of nonylphenol and ethylene oxide; trimethyl nonyl polyethylene glycol ethers; polyethylene oxide adducts of fatty and resin acids, and long chain alkyl mercaptan adducts with ethylene oxide.

With the type of boom-spray apparatus used in this work, it has been found convenient to apply the bacitracin to the sugarcane field in the form of an aqueous solution, suspension or emulsion having a concentration of active agent such that the application at the rate of from 5 to 20 gallons of liquid composition per acre will provide the required dosage of active chemical. However, the use of lower or higher gallonages may be preferred when a different dispensing mechanism is used.

The preferred carrier for the active ripening agent is water to which about 0.1 to 2 percent by weight of surface active agent has been added. However, instead of using water as the carrier, non-phytotoxic mineral oils either as such or in the form of water-in-oil or oil-in-water emulsions may be used similarly in accordance with practices which are otherwise well known in the art of treating vegetation in the field with beneficial growth control agents. Excellent results are obtained when bacitracin is present as essentially the sole active ingredient in the treating composition, but it may also be applied in combination with other ripeners.

DESCRIPTION OF SPECIFIC EMBODIMENTS

EXAMPLE 1

Part A - Preparation of Treating Composition

A treating composition is prepared by weighing out 1 gram of bacitracin and dissolving it in approximately 6 ml of water. This solution is then diluted with water to exactly 8 ml and 1 drop of commercial "Tergitol NPX" (liquid) surfactant is added with a medicine dropper to the diluted solution. The resulting solution is agitated by shaking prior to application.

Part B - Application of Bacitracin Composition to Cane

A 0.3 ml dose of the aqueous solution containing 38 mg bacitracin, prepared as described in Part A above, was applied on the spindle area at the top of the last visible dewlap of each of 20 stalks of sugarcane in a test plot in a commercial field of cane in Hawaii, using a syringe with a fine needle as a microapplicator.

Another group of 20 stalks in the same test plot were treated in an identical manner with "Trysben" (dimethylamine salt of 2,3,6-trichlorobenzoic acid), used as a standard because of its known and consistent good activity.

in the case of cane harvested 4 weeks after treatment and in the case of cane harvested 5 weeks after treatment. Bacitracin thus is shown to produce a high effect relatively quickly and yet to maintain it nearly constant over a considerable period. Both 4 weeks and 5 weeks after the application of the bacitracin the sucrose yield available from the treated cane in this test was more than 35 percent greater than that available from the untreated control, and more than about 20 percent greater than that available from the Trysben treated lot.

TABLE I

Cane Variety: H50 7209 - Field A
Age: 23.75 months
Date of Treatment: Oct. 13, Year X

| Ripening Agent | Harvest Time After Treatment | | | |
|---|---|---|---|---|
|  | 4 Weeks | | 5 Weeks | |
|  | Juice Purity | Pol % Cane | Juice Purity | Pol % Cane |
| Bacitracin 38 mg/stalk (4 lbs./acre) | 76.51 | 10.69 | 80.79 | 10.47 |
| Trysben (standard) | 67.84 | 7.65 | 76.21 | 8.72 |
| Control (untreated) | 67.97 | 7.72 | 70.46 | 7.70 |

The age of the cane at the time of application was 23.75 months.

A set of 10 of these treated stalks from each group were harvested 4 weeks (28 days) after such treatment and another set of 10 were harvested about 5 weeks (37 days) after such treatment. At each harvest a set of 10 untreated stalks from the same plot were also harvested as a control.

The top 15 joints of each 10-stalk set of the treated stalks, as well as those of untreated control stalks from the same test plot, were removed, and each set was combined and analyzed in terms of juice purity and pol percent cane, following the so-called "press method" developed by T. Tanimoto, Hawaiian Planters' Record, 57, 133 (1964). "Pol percent cane" is a polarimetric determination and equals the percentage of sucrose if sucrose is the only optically active substance in the solution. In any event, determination of the pol percent cane is a standard and effective method for determining the sucrose content of sugarcane. The results are given in Table I.

The data show a major increase in sucrose yield in the cane which was treated with bacitracin as compared either with the untreated cane or even with the cane which was treated with the standard ripener, Trysben. The improvement is conspicuous in this test both Part C The effect of the ripener is of course somewhat dependent on the variety and age of the cane being treated, the amount of ripener applied, the atmospheric conditions between treatment and harvest time, and so on. This is illustrated by the data shown in Tables II and III below. In obtaining the data reported in these tables the same procedure was followed as that described in Part B, except that the field location, age and/or variety of the cane treated and the time of year were different, as indicated in the tables.

The tabulated data show that in each test series the application of bacitracin produced a very important increase in sucrose yield over that obtained in the untreated control and in most cases even over that obtained in the Trysben treated standard.

The data also show that bacitracin maintains its activity fairly constant over many weeks and that the benefits of the present invention can be obtained with similar effect at various stages of natural maturity of the cane at the time of treatment or harvest.

The nature, scope, utility and effectiveness of the present invention have been described and exemplified in the foregoing specification. However, these examples are not intended to be limiting and the true scope of the invention which is entitled to patent protection is particularly pointed out in the appended claims.

TABLE II

Cane Variety: H59 3775 - Field B
Age: 20.0 months
Date of Treatment: January 31, Year X + 1
Dates of Harvest: February 28 and March 3

| Ripening Agent | Harvest Time After Treatment | | | |
|---|---|---|---|---|
|  | 4 Weeks (28 days) | | 5 Weeks (35 days) | |
|  | Juice Purity | Pol % Cane | Juice Purity | Pol % Cane |
| Bacitracin 38 mg/stalk (4 lbs/acre) | 81.02 | 11.07 | 80.23 | 10.95 |
| Trysben (standard) | 79.23 | 9.75 | 82.15 | 10.99 |
| Control (untreated) | 78.34 | 9.73 | 79.26 | 9.93 |

TABLE III

Cane Variety: H50 7209 - Field C  
Age: 18.5 months  
Date of Treatment: November 6, Year X + 1  
Dates of Harvest: December 4 and December 11

| | Harvest Time After Treatment | | | |
|---|---|---|---|---|
| | 4 Weeks (28 days) | | 5 Weeks (35 days) | |
| Ripening Agent | Juice Purity | Pol % Cane | Juice Purity | Pol % Cane |
| Bacitracin 38 mg/stalk (4 lbs./acre) | 67.45 | 7.45 | 68.44 | 7.59 |
| Trysben (standard) | 77.01 | 9.02 | 62.32 | 6.42 |
| Control (untreated) | 57.22 | 4.97 | 64.19 | 6.33 |

What is claimed is:

1. A process for modifying the ripening of field grown sugarcane plants so as to increase its yield of sucrose which comprises applying bacitracin in a sucrose increasing amount directly to the cane plants at a time from 2 to 10 weeks prior to harvest.

2. A process according to claim 1 wherein bacitracin is sprayed onto the cane plants as a liquid composition containing water as a carrier.

3. A process according to claim 1 wherein bacitracin is applied to the cane plants as an aqueous solution or suspension at the rate of 5 to 20 gallons of aqueous composition per acre.

4. A process according to claim 3 wherein the cane plants are between 18 and 24 months of age when the bacitracin is applied thereto.

5. A process according to claim 3 wherein the aqueous composition contains between 0.1 and 2 percent by weight of a surface active agent.

6. A process according to claim 3 wherein the aqueous composition contains between 0.1 and 2 percent by weight of a nonionic surface active agent.

* * * * *